Patented Nov. 12, 1940

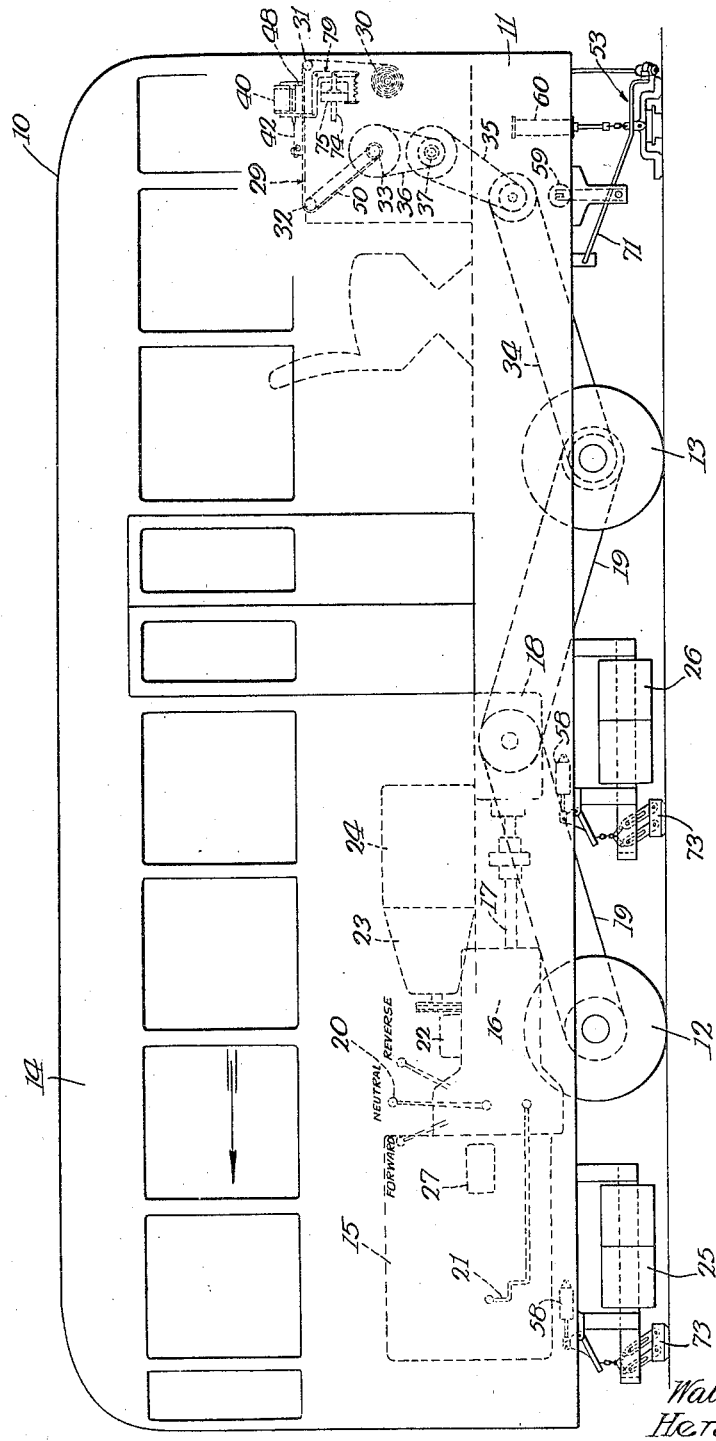

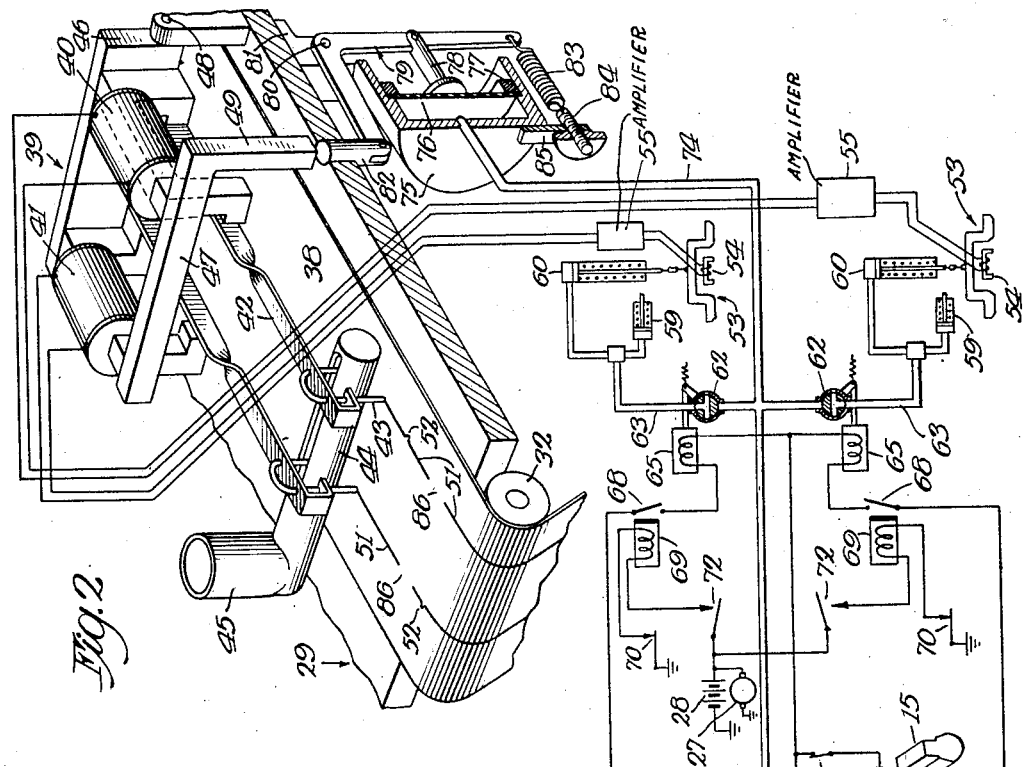
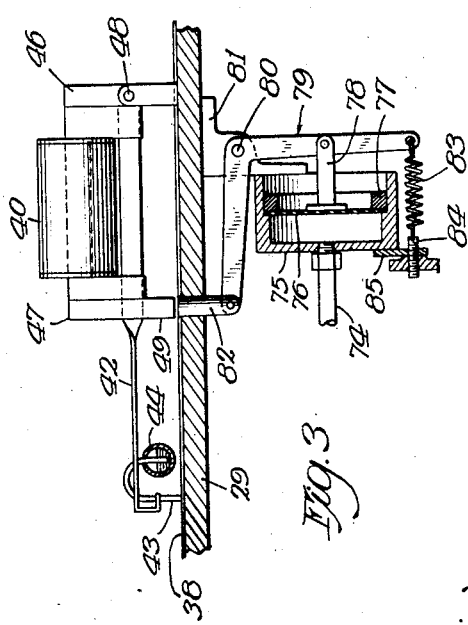

2,220,881

UNITED STATES PATENT OFFICE 2,220,881

RECORDING APPARATUS FOR DETECTOR CARS

Walter C. Barnes, Lake Bluff, and Henry W. Keevil, Highland Park, Ill.

Application June 6, 1938, Serial No. 212,120

15 Claims. (Cl. 175—183)

Rail flaw detector cars generally equipped with primary flaw detecting apparatus adapted to indicate on a moving record tape in the car the presence of flaws in rail over which the car is travelling. When an indication is made on the record tape which does not correspond to a visible surface defect that can be assumed to be the cause of the indication, the car in routine testing, is stopped, backed up to a point beyond the place where the rail gave rise to the indication, and then run forward over the suspected rail fissure to see if the indication is again produced on the record tape. Experience has shown that many times a second run over the suspected rail will clear up the indication, which can be safely construed as meaning that the original indication was caused by some inconsequential rail condition, as for example a magnetic spot, or the like. On the other hand, if the indication is repeated on the record tape, it is the general practice to stop the car and test it by hand with secondary flaw detecting apparatus, usually of the type which operates on the electrical drop in potential flaw detection principle.

The principal object of this invention is to automatically record on the record tape the places where repeat runs are made so that the record will be more easily read and understood, and to accomplish this function with extremely simple mechanism.

Further and other objects and advantages will become apparent as the disclosure proceeds and the description is read in conjunction with the accompanying drawings, in which Fig. 1 is a diagrammatic view of a detector car equipped with this invention, and showing the general organization of the car;

Fig. 2 is a perspective view of the pen unit and pen lifting mechanism with the electrical and pneumatic systems for controlling their operation shown in diagrammatic form; and Fig. 3 is a side elevational view of the pen unit and lifting mechanism.

For the purpose of illustration, the invention has been shown applied to a detector car 10 using the recently developed residual magnetism method for locating flaws in track. The car comprises an underframe 11 mounted on wheeled axles 12 and 13 and carrying a house body indicated diagrammatically at 14. The car is propelled by a gasoline or Diesel engine 15 through a transmission 16, propeller shaft 17, gear box 18, and chains 19. The car can be driven at relatively high speeds in either direction, a direction lever 20 having forward, neutral and reverse positions controlling the direction of car movement. A gear shift lever for changing gear ratios is indicated at 21.

A power takeoff device 22 from the transmission 16 transmits power from the engine 15 to generators 23 and 24, the former being a high amperage, low voltage generator used with the secondary flaw detecting apparatus for hand testing suspected rails, and the latter being a relatively high voltage generator (preferably 110 volts) for energizing the main magnets 25 and 26 mounted in front of and in rear of, respectively, the front wheels 12. In addition, there is a small generator 27 (six volts) which is driven from the engine 15 to keep the battery 28 (Fig. 2) charged at all times for operating miscellaneous low voltage circuits.

For normal testing of rails, the car is moved at a rate of a few miles per hour in the direction indicated by the arrow in Fig. 1, and the engineer in charge of testing, or operations engineer as he is frequently called, watches the record which is made on the recording table, generally designated 29. Rotatably supported beneath the table is a tape roll 30, the free end of which is looped over rollers 31 and 32 and threaded into a feed roll 33 which is constantly driven in a counterclockwise direction (Fig. 1) as long as the car is moving forwardly by a series of chain drives from the rear wheel 13, the drives being indicated generally at 34, 35 and 36. An overrunning clutch, indicated generally at 37, of any conventional type, is interposed in the drive from the rear wheel 13 to the feed roll 33 so that when the car is moving rearwardly, the feed roll 33 is not rotated. The particular form for the overrunning clutch is of no importance to this disclosure except that it should immediately take hold whenever the car moves forwardly while permitting free slippage between the driving and driven members when the car is moving rearwardly.

The portion of the record tape 38 between the rollers 31 and 32 passes under a pen unit, generally designated 39 consisting of pen relays 40 and 41, each of which has a forwardly extending armature 42 carrying a syphon pen 43, the lower end of which rests upon the record tape 38 and the other end being immersed in an ink trough 44 which is kept at a predetermined level by an ink reservoir 45.

The pen relays 40 and 41 are mounted in a frame comprising a back plate 46 and a front bar 47, the former being pivotally supported on a horizontal pin 48 to permit the entire pen unit to be swung in a vertical plane, and the latter being bent downwardly as indicated at 49, to form a stop which fixes the lowermost position of the pen unit 39 and prevents the armatures 42 from being damaged when the pen unit 39 is swung to operative position too sharply.

It is obvious that as the car is propelled forwardly, the record tape is also moved forwardly at a speed which is proportional to the speed of the car, the movement of the tape being effected by the rotation of the winding drum 33 and roller 32, the latter preferably being positively driven by a chain 50 from the drum 33. As the tape moves under the pens 43, record lines generally indicated at 51 are made on the tape by the pens, and these lines are perfectly straight as long as neither of the pen relays 40 and 41 is actuated. When an electrical impulse is sent through either of the relays, the corresponding armature 42 is moved sidewise, causing a slight jog in the record line, as indicated at 52. These jogs, or indications are made whenever one or the other of the two flux responsive devices 53 encounters a residual magnetic field in the vicinity of the rail, and when this happens in either device, an electrical impulse is induced in the induction coil 54, amplified in a thermionic amplifier 55 and then transmitted to the pen relay associated with that flux responsive device.

Whenever an indication 52 is made on the record tape 38 which does not correspond with a visible surface defect on the rail, the car is stopped and a repeat run is made. It is desirable to have the record tape show the exact place on the record where the repeat run starts in order that the record can be more easily read and understood.

In the present invention, this is accomplished by providing means for making a gap in the record line whenever the car is stopped and moved forwardly again although many other ways can be used for automatically applying to the record tape a mark or other indication to distinguish between continuous runs and repeat runs, and this invention is intended to include such other means for accomplishing the same results.

In the illustrative embodiment of the invention, advantage is taken of the fact that whenever the car is stopped, the engine is normally permitted to idle and that it takes a short time interval after the engine has been speeded up for the generators driven by the engine to pick up their voltage. The use of this circumstance in automatically indicating the start of repeat runs is best shown in Fig. 2 where a portion of the electrical and pneumatic control systems is shown. In that figure, an air reservoir 56 which communicates with the main air line 57 leading to the lift cylinders 58 associated with the magnets 25 and 26, and to the pushover cylinder 59 and lift cylinder 60, associated with each flux responsive device 53. A master control valve 61 in the line 57, opened magnetically and closed by spring pressure, and similar valves 62 in the branch line 63 leading to the cylinders 59 and 60 control the passage of air to these cylinders.

The valve 61 in the line 57 and the valve 62 in the branch line 63 are opened by solenoids 64 and 65, respectively, the solenoids in each instance being connected across the generator 24, and all three solenoids being connected in parallel with one another. A master switch 66 controls all three solenoids, and a switch 67 associated with the direction lever 20 makes it possible for the solenoid 64 to be energized only when the car is moving forward. In neutral and reverse positions of the lever 20, the contacts associated with the switch 67 are open.

The circuit through each of the solenoids 65 is controlled by a relay 68, the operating coil 69 of which is in series with an automatic safety switch 70 that is mounted on the supporting arm 71 for the flux responsive device 53 and is opened whenever the arm moves through an angle greater than normally required for the car to round curves, and a hand switch 72 which enables the raising and lowering of the detector carriage, or flux responsive device 53, to be controlled from within the car. The battery 28 is used to energize this circuit as well as the similar circuit associated with the solenoid 65 on the other side of the car.

Assuming that the car is moving forwardly with the direction lever 20 in position to close the switch 67, and assuming also that the master switch 66 has been closed, the solenoid 64 is energized, permitting air under pressure to enter the line 57 and lower the movable pole pieces 73 associated with the magnets 25 and 26. If either of the switches 72 are then closed, the corresponding solenoid 65 is energized, opening the valve 62 in the branch line 63 and permitting air under pressure to flow into the cylinders 59 and 60, thereby lowering the flux responsive device 53 to the rail in a manner which is of no particular importance to the present disclosure.

The main line 57 has an extension 74 in direct communication with it, but preferably of much smaller diameter, which leads to a small cylinder 75 located beneath the pen unit 39. The cylinder is closed at its rear end by a flexible diaphragm 76 held in place on its seat by a ring 77 and having a stem 78 secured to its central portion for controlling the movement of a bell crank lever 79 fulcrumed at 80 to a bracket 81 on the underside of the table 29. The upper end of the bell crank lever 79 is connected to a short plunger 82 which extends through an opening in the table 29 directly beneath the stop 49. The lower end of the bell crank lever 79 is connected by a spring 83 to an adjusting screw 84 supported in a small bracket 85 secured to the cylinder 75. Obviously when air is admitted to the cylinder 75, the stem 78 is pushed outwardly, causing the bell crank lever to rock on its fulcrum 80 to retract the plunger 82 so that the pens 43 rest upon the record tape 38 and are in position to make the record lines 51. When the air pressure in the cylinder 75 is reduced to atmosphere, as is the case when the valve 61 is closed due to deenergization of the solenoid 64, the spring 83 acts on the bell crank lever to force the plunger 82 upwardly, thereby rocking the entire pen unit 39 on its pivot 48 and raising the pens 43 from the record tape.

Since the generator 24 is directly connected through the power take-off 22 to the engine 15, it is apparent that when the engine is idled, as is the case when the car is stopped, the voltage across the generator drops and all of the valve operating solenoids become de-energized with the result that pressure in the main line 57 and branch lines 63 is reduced to atmospheric pressure, thereby allowing the springs associated with the various lift and pushover cylinders 58, 59 and 60 to raise the pole blocks 73 and flux responsive devices 53 from the rails. At the same time, the pressure in the line 74 is reduced and the pen unit 39 is lifted. When the car is put in reverse by moving the direction levers 20 rearwardly to make a repeat run, the switch 67 remains open, and no current can flow through the solenoid 64 to open the valve 61. Hence on the backward run, the pen unit remains in raised position and, of course, the tape 38 remains stationary due to the overrunning clutch 37. When the car is ready to start on the repeat run, the direction lever 20 is moved forwardly to close the contact 67 and the engine is speeded up as the car starts forward. As soon as the car begins to move, the record tape 38 makes a corresponding movement, but it is not until the car has gained enough momentum to result in the engine reaching a speed sufficient to raise the generator voltage to the pickup value of the solenoid 64 that the valve 61 is opened, allowing compressed air to flow into the main line 57 and into the extension 74 of that line. The pen unit 39 is then automatically lowered to the record tape 38, but only after the tape has moved a distance represented by the gap 86 in the record line, and this gap indicates, under ordinary testing circumstances, that the record which follows is a repeat run.

It should be understood that whenever the voltage across the generator 24 is sufficient to energize the solenoid 64, the solenoids 65 are also energized so that the flux responsive devices 53 are also lowered to the rail.

In practical test work, a repeat run is always made after the car has been stopped for any reason, since all actual testing must be done at a fairly uniform speed. Before the testing can be continued, it is necessary to back up the car several rail lengths in order to bring the car to testing speed over that portion of the track where the car was stopped.

The switch 67 associated with the direction lever 20 is not absolutely necessary when the generator 24 is operated from the propulsion engine 15, since no harm is done in allowing the pen unit to drop on the record tape while it is held stationary during the backward run. It is of some importance, however, when the generator 24 is operated by some other source of power, as, for example, a constantly driven auxiliary engine, in which case, the gap in the record is made by shifting the direction lever 20 from forward to reverse position before the car is brought to a stop (this is normally done in order to make the gear change while some of the gears are rotating). The short distance which the car travels from the time the gear shift is made until the car is brought to a stop causes the record tape 38 to move a corresponding amount while the pen unit is up with the result that when the car is moved forward again, there is a gap in the record to indicate the beginning of the repeat run.

Obviously, various modifications will occur to those skilled in the art, and the appended claims should be construed as broadly as the prior art will permit. For example, means may be provided so that when the rail energizing magnets 25 and 26 are de-energized for backward runs, the pen unit is raised from the record tape, and when the magnets are again energized, a time delay relay functions to automatically delay the lowering of the pen unit until the car has been given time to move forward at least a short distance. Also, it is possible to divide the pen unit into two parts and provide separate pen lifting mechanism for each pen with the operating cylinder 75 communicating with the branch line 63 of the particular flux responsive device 53 rather than with the main line pipe 57. In this way, the pen units are lowered only when the detector carriage which operates the particular unit is in testing position.

It should be understood that the teachings of this invention have equal applicability to the electro-inductive method of testing where on repeat runs, the brush carriage is raised either manually or automatically whenever the car is put in reverse.

Another way in which a gap may be produced in the record line to indicate repeat runs when the generator is driven from an auxiliary constant speed engine is by using an electrical relay controlled by the six volt generator 27, the output of which falls off when the propulsion engine 15 is allowed to idle. If desirable to keep the pen unit raised while the car is moving rearwardly, the six volt relay can be connected in series with the direction lever switch 67.

We claim:

1. In a car for detecting flaws in rails, a record tape driven in proportion to car speed when the car is moved forwardly but remaining stationary when the car is moved rearwardly, a pen unit associated with the tape for making a continuous mark on the tape as the latter is moved with respect to the pen unit, flaw detecting apparatus adapted to actuate the pen unit whenever the car passes over a flaw in the rail, and automatic means for making an indication on the record tape whenever the car is stopped.

2. In a car for detecting flaws in rails, flaw detecting apparatus including a flux responsive device, a pen unit, and a record tape, means for moving the tape in proportion to car speed when the car is moving forwardly, and means for automatically lifting the pen unit from the tape when the car is stopped.

3. In a car for detecting flaws in rails, flaw detecting apparatus including a flux responsive device, a pen unit and a record tape, means for moving the tape in proportion to car speed, means for raising and lowering the pen unit with respect to the tape, and automatic means for making an indication on the tape whenever the car is stopped.

4. In a car for detecting flaws in rails, flaw detecting apparatus including a flux responsive device, a pen unit and a record tape, means for moving the tape in proportion to car speed, means for raising and lowering the pen unit with respect to the tape, and automatic means for rendering the pen unit inoperative whenever the car is stopped and for a short interval after it has again started.

5. In a car for detecting flaws in rails, flaw detecting apparatus including a flux responsive device, a pen unit and a record tape; means for moving the tape in proportion to car speed, means for raising and lowering the pen unit with respect to the tape, and automatic means for rendering the pen unit inoperative whenever the car is stopped and for a short interval after it has again started, said means comprising an air cylinder for lifting the pen unit from the tape.

6. In a car for detecting flaws in rails, a record tape driven in proportion to car speed when the car is moved forwardly but remaining stationary when the car is moved rearwardly, a pen unit associated with the tape for making a continuous mark on the tape as the latter is moved with respect to the pen unit, flaw detecting apparatus adapted to actuate the pen unit whenever the car passes over a flaw in the rail, means for raising and lowering the pen unit with respect to the tape, and means for automatically raising the pen unit whenever the car is stopped.

7. In a car for detecting flaws in rails, an engine for propelling the car, a record tape driven in proportion to car speed when the car is moved forwardly but remaining stationary when the car is moved rearwardly, a pen unit associated with the tape for making a continuous mark on the tape as the latter is moved with respect to the pen unit, flaw detecting apparatus adapted to actuate the pen unit whenever the car passes over a flaw in the rail, and automatic means for making an indication on the record tape whenever the car is stopped, said means including a source of compressed air, an air cylinder connected to the source for raising and lowering the pen unit with respect to the tape, an electro-pneumatic valve interposed between the source and the cylinder, and means responsive to engine speed for opening and closing the valve to control the operation of the cylinder.

8. In a car for detecting flaws in rails, a detector carriage, means for raising and lowering the carriage, a record tape driven in proportion to car speed when the car is moved forwardly but remaining stationary when the car is moved rearwardly, a pen unit associated with the tape for making a continuous mark on the tape as the latter is moved with respect to the pen unit, flaw detecting apparatus including a detector coil carried by the detector carriage and operatively connected to the pen unit, and means for rendering the pen unit inoperative whenever the detector carriage is in its raised position.

9. In a car for detecting flaws in rails, a detector carriage, means for raising and lowering the carriage, a record tape driven in proportion to car speed when the car is moved forwardly but remaining stationary when the car is moved rearwardly, a pen unit associated with the tape for making a continuous mark on the tape as the latter is moved with respect to the pen unit, flaw detecting apparatus including a detector coil carried by the detector carriage and operatively connected to the pen unit, and means for making an indication on the tape whenever the detector carriage is in its raised position.

10. In a car for detecting flaws in rails, a record tape driven in proportion to car speed when the car is moved forwardly but remaining stationary when the car is moved rearwardly, a pen unit associated with the tape for making a continuous mark on the tape as the latter is moved with respect to the pen unit, flaw detecting apparatus adapted to actuate the pen unit whenever the car passes over a flaw in the rail, and automatic means for making an indication on the record tape whenever the car is stopped and moved rearwardly.

11. In a car for detecting flaws in rails, a propulsion engine, a direction lever associated with the engine, a record tape driven in proportion to car speed when the car is moved forwardly but remaining stationary when the car is moved rearwardly, a pen unit associated with the tape for making a continuous mark on the tape as the latter is moved with respect to the pen unit, flaw detecting apparatus adapted to actuate the pen unit whenever the car passes over a flaw in the rail, and automatic means for making an indication on the record tape whenever the car is stopped and moved rearwardly, said means including a switch associated with the direction lever.

12. In a car for detecting flaws in rails, rail energizing means, a record tape driven in proportion to car speed when the car is moved forwardly but remaining stationary when the car is moved rearwardly, a pen unit associated with the tape for making a continuous mark on the tape as the latter is moved with respect to the pen unit, flaw detecting apparatus including a flux responsive device adapted to actuate the pen unit whenever the car passes over a flaw in the rail, and automatic means for making an indication on the record tape whenever the rail energizing means is rendered ineffective.

13. In a car for detecting flaws in rails, flaw detecting apparatus including a flux responsive device, a registering unit, a record tape, means for moving the tape under the registering unit when the car is moving forwardly, and means for lifting the registering unit automatically from the tape when the car is stopped and returning the unit with a delayed action after forward movement of the car is resumed.

14. In a car for detecting flaws in rails, flaw detecting apparatus including a flux responsive device, a recording unit including a record tape, means for moving the tape under the recording unit when the car is moving forwardly, and means for removing the recording unit from operation automatically when the car is stopped including means for returning the unit to operation with a characteristic indication controlled independently of the resumed movement of the tape after the forward movement of the car is resumed.

15. In a car for detecting flaws in rails, flaw detecting apparatus including a flux responsive device, a recording unit including a record tape upon which a characteristic mark is made for each flaw detected, means for moving the tape under the recording unit when the car is moving forwardly, and means for automatically making upon the tape an indication different from said characteristic flaw indications when the car is stopped and forward movement of the car is resumed.

WALTER C. BARNES.
HENRY W. KEEVIL.